Figure 1:
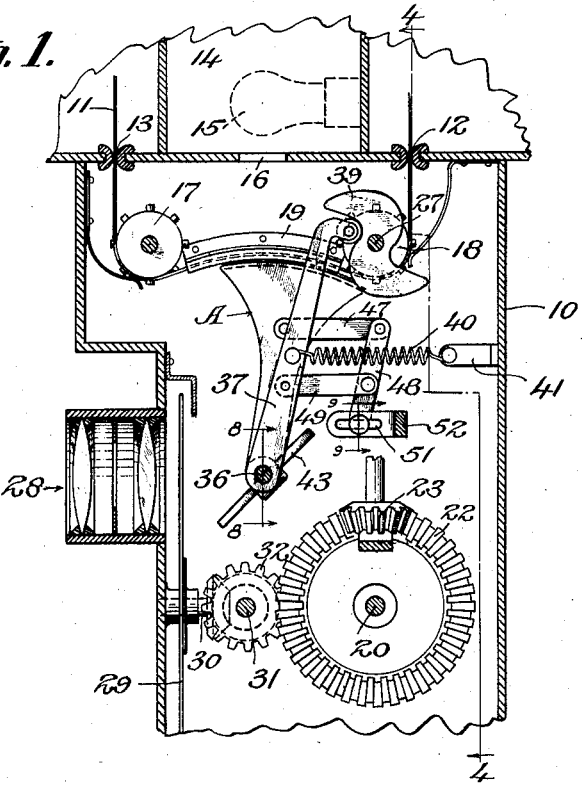

May 12, 1931.  W. K. GRIMM  1,804,685
MOTION PICTURE APPARATUS
Filed Feb. 4, 1929  2 Sheets-Sheet 1

Inventor
William K. Grimm,
By Louis C. Vanderlip,
Attorney

May 12, 1931.  W. K. GRIMM  1,804,685
MOTION PICTURE APPARATUS
Filed Feb. 4, 1929  2 Sheets-Sheet 2
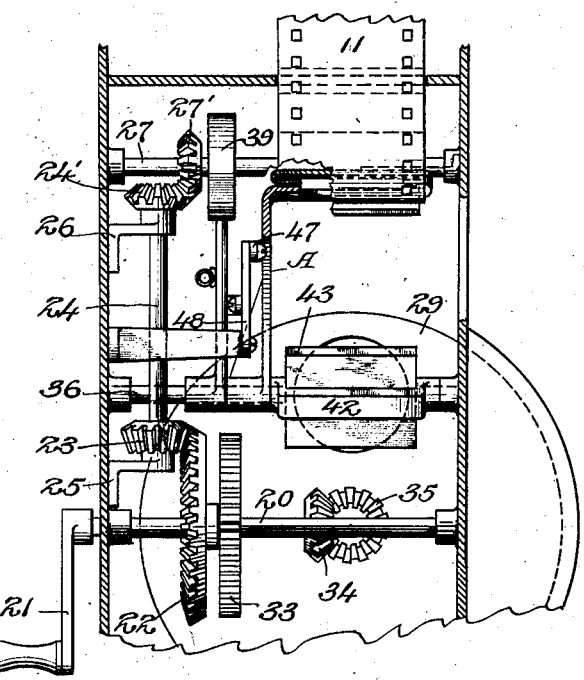

Patented May 12, 1931

1,804,685

UNITED STATES PATENT OFFICE

WILLIAM K. GRIMM, OF ELKHART, INDIANA

MOTION PICTURE APPARATUS

Application filed February 4, 1929. Serial No. 337,189.

My invention relates to motion picture apparatus.

The purpose of my invention is the provision of an apparatus of the type specified which embodies an exceedingly simple construction, selectively usable either as a picture camera or projector, and which is exceedingly quiet in operation.

It is also the purpose of my invention to incorporate therein a construction which will enable me to take and project, as the case may be, motion pictures by continuous movement of the film, thus eliminating the jerking thereof which is incident to those projectors and cameras utilizing intermittent film movement. In addition, by continuously moving the film I introduce an exceedingly useful element of construction and operation in the taking of "talking" pictures in that it enables each sound element and its related status in the picture to be accurately imposed at the same point in the longitudinal length of the film so that in the subsequent projection perfect synchrony between the visual and audible elements of the film will be present.

Furthermore, the construction embodied in my invention is such that when the same is used for taking motion pictures, the period of film exposure is lengthened over that which occurs in motion picture cameras of the intermittent type, with the resulting advantage that the picture sought can be taken under light conditions which would ordinarily be considered unsuitable for such an operation.

I will describe my invention in the best form known to me at present, but it will be understood that the same is suceptible to desirable changes and additions with the exercise of only ordinary mechanical skill and without departing from the spirit thereof.

In the drawings chosen to illustrate my invention, the scope whereof is set forth in the appended claims.

Figure 2:
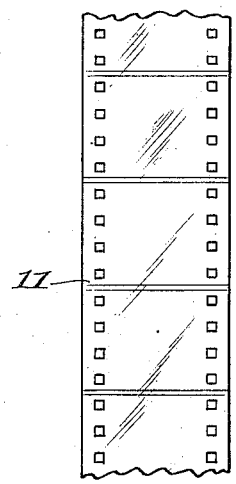
Figure 3:
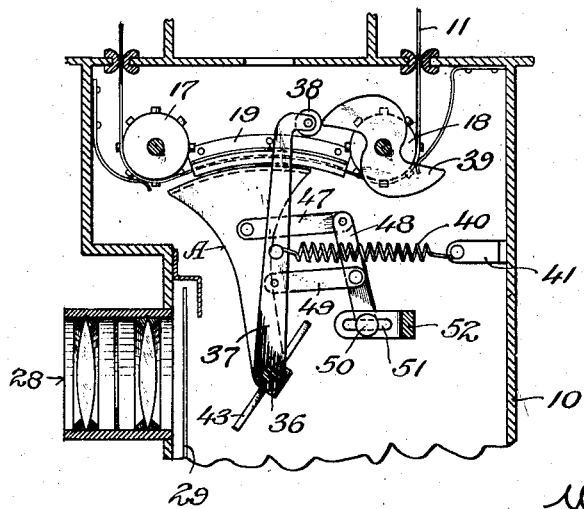

Figure 1 is a side view of a fragment of a motion picture apparatus embodying my invention; certain parts being broken away, others in section, and the remainder in elevation;

Figure 2, a plan view of a section of conventional motion picture film;

Figure 3, a view similar to Figure 1 and showing certain parts in another extreme operating position from that disclosed in Figure 1;

Figure 4, a section on the line 4—4 with certain parts broken away and portions of the film guide and frame mask shown in section;

Figures 5, and 6, detail views of the framing mask;

Figure 7, a detail perspective view showing the mounting of the reflecting mirror, framing mask and cam lever.

Figure 8, a section on the line 8—8 of Figure 1; and

Figure 9, a section on the line 9—9 of Figure 1.

Referring to the drawings my invention is shown as comprising a suitable casing 10 above which is carried the usual take up and reel for a film 11 of conventional construction as shown in Figure 2. This film 11 enters the casing 10 from the usual reel through a slit 12 and passes from said casing to the take up through a slit 13. Provided on top of the casing 10 is a compartment 14 wherein is adapted to be mounted a projector light 15, the beam of which can enter the casing 10 through an opening 16. Movement of the film 11 is continuous and is controlled by rotation of the usual sprocket wheels 17 and 18 and guide 19, the latter being arcuate in formation and located between the sprockets 17 and 18 in line with the opening 16.

The mechanism for continuously driving the film 11 comprises a drive shaft 20 journaled in the casing 10 transverse the film 11 and adapted to be rotated by a crank 21 located exteriorly of the casing. Fixed on this shaft is a bevel gear 22 which meshes with a bevel gear 23 fixed on the lower end of a vertical shaft 24 journaled in bearing brackets 25, 26 mounted on the casing 10. The sprocket 18 is fixed on a shaft 27 journaled in suitable bearings on the sides of the casing 10. Also fixed on the shaft 27 is a bevel gear 27' which meshes with a bevel gear 24' fixed on the upper end of the shaft 24. From the foregoing construction it will be obvious that upon proper rotation of the crank 21 continuous movement will be imparted to the film 11 in the direction of the arrow in Figure 1.

The apparatus illustrated also embodies a conventional lens 28, the light beam of which is controlled by a conventional shutter 29 fixed on a rotatable stub shaft 30. Another shaft 31 is journaled in the casing 10 between the shafts 30 and 20 parallel to the latter. Fixed on this shaft 31 is a gear 32 in mesh with a gear 33 fixed on shaft 20. Also fixed on the shaft 31 is a bevel gear 34 which meshes with a bevel gear 35 fixed on shaft 30. It will be apparent that the connection between the shafts 20 and 30 provided by gears 33, 32, 34 and 35, serves to impart the proper functional rotation to the shutter 29.

More particularly my invention resides in novel structure for controlling the reflection of the light beam from the lens 28 to the film 11, or the light beam from the source 15 through the film 11 to the lens 28 according to whether the apparatus is used for taking motion pictures or for projecting pictures from the film. Accordingly I journal between the sides of the casing 10 a shaft 36, the longitudinal axis of which intersects the longitudinal axis of the lens 28 at right angles. Fixed on this shaft is an arm 37, the free end of which carries a roller cam follower 38 in engagement with a cam 39 fixed on shaft 27. I connect this arm, at a point therein about midway its length, with one end of a spring 40, the other end of said spring being connected to a bracket 41 mounted on the casing 10. This spring is in tension and constantly urges the arm 37 to the right in Figures 1 and 3, as will be apparent. It will also be apparent from the structure so far described that upon rotation of the crank 21 in a counter-clockwise direction the cam 39 will serve to move the arm 37 from the position shown in Figure 1 to the position shown in Figure 3. Upon further rotation of the cam beyond the position shown in Figure 3, it will, due to its shape, precipitately release the arm 37 to the influence of the spring 40 and said arm will be quickly returned by the spring to the position shown in Figure 1. This oscillating movement of the arm 37, and of course the same movement of the shaft 36 on which it is fixed, synchronizes with the movement of the film 11, the operating connections of the apparatus being properly tuned to produce that result. It will be noted that the shaft 36 is made up of end sections connected by an intermediate section 42 shaped to provide a mounting for a reflector 43 properly positioned behind the lens 28 to reflect the light beam from the lens to the film 11 or the light beam from the source 15 to the lens 28 according to whether the apparatus is being used to take or project a picture. As the reflector 43 is fixed to the shaft 36 it will oscillate with said shaft in synchronism with the movement of the film 11. Loosely mounted on the shaft 36 between the arm 37 and the reflector 43 is a frame mask A. This frame mask embodies an arm 44 radiating from the shaft 36 and having a lateral extension 45 which overlies the lower face of the film 11. An opening 46 is provided in the lateral extension 45 and through this opening the desired light beam passes to or from the film 11. The arm 44 of the frame mask is connected to the arm 37 by a link 47, pivoted arm 48 and link 49. The arm 48 is pivotally mounted on a connection 50 and this connection in turn is adjustably mounted in a slot 51 of a bracket 52, said bracket being carried by the casing 10. As a result of the connection between the frame mask A and lever 37 just described it will be apparent that the frame mask oscillates with the arm 37 and shaft 36 in synchronism with the movement of the film 11. It will also be further apparent that by adjusting the connection 50 in slot 51 the reflector and frame mask will be adjusted relatively to each other.

In the use of the apparatus as a camera, assuming the parts to be in the position shown in Figure 1 and the shutter 29, open, the light beam from the lens is reflected by 43 through the opening 46 of the frame mask against the film 11. This status remains during movement of the parts specified to the position shown in Figure 3, the oscillation of the reflector during such movement maintaining the light beam on a fixed part of the film during movement of the latter. When the parts specified reach the position shown in Figure 3 the shutter 29 closes and the cam 39 releases the arm 37 to the spring 40, which latter quickly returns the parts to the position shown in Figure 1, when the operation just described is repeated. In the use of the apparatus as a projector the operation will be the same except that the light beam would emanate from the source 15.

I claim:

1. In a motion picture apparatus, means to move a film continuously, a rotatable shaft transverse the film, an arm fixed on the shaft, means to oscillate said arm and shaft in synchronism with the movement of the film, a reflector fixed on said shaft, and a framing mask overlying the film, said framing mask being loosely mounted on the shaft and connected to said arm by an adjustable lever and linkage whereby the position of the framing mask with respect to the reflector may be altered.

2. In a motion picture apparatus, means to move a film continuously, a rotatable shaft transverse the film, an oscillating arm fixed on the shaft, means to oscillate said arm in synchronism with the movement of the film, said means comprising a cam device for imparting one movement of oscillation to the arm and a spring device for imparting the other movement of oscillation thereto, a reflector fixed on said shaft, a framing mask overlying the film, said framing mask being loosely mounted on the shaft and connected to said arm, and linkage means for altering the position of the framing mask with respect to the reflector, said means comprising a pivotally mounted arm, a link connecting one end thereof with the framing mask, a second link connecting said arm with said oscillatory arm, and means for adjusting the pivotal mount of said linkage arm.

3. In a motion picture apparatus, means to move a film continuously, a rotatable shaft transverse the film, an arm fixed on the shaft, means to oscillate said arm and shaft in synchronism with the movement of the film, a reflector fixed on said shaft, a framing mask overlying the film, and loosely mounted on said shaft, and adjustable lever and linkage means connecting the framing mask with said arm, said means including means for slidably adjusting the pivotal bearing of said lever.

4. In a motion picture apparatus, means to move a film continuously, a rotatable shaft transverse the film, an arm fixed on the shaft, means to oscillate said arm and shaft in synchronism with the movement of the film, a reflector carried on said shaft, a framing mask overlying the film and loosely mounted on said shaft, and adjustable lever and linkage means connecting the framing mask with said arm, said means including a bearing for said lever and a slot and pin connection between said lever and bearing.

In witness whereof I have hereunto affixed my signature this 31st day of January, 1929.

WILLIAM K. GRIMM.